Dec. 28, 1948.   J. R. SEBASTIAN   2,457,407
ROLLER SUPPORT FOR CONVEYER BELTS
Filed Jan. 8, 1945
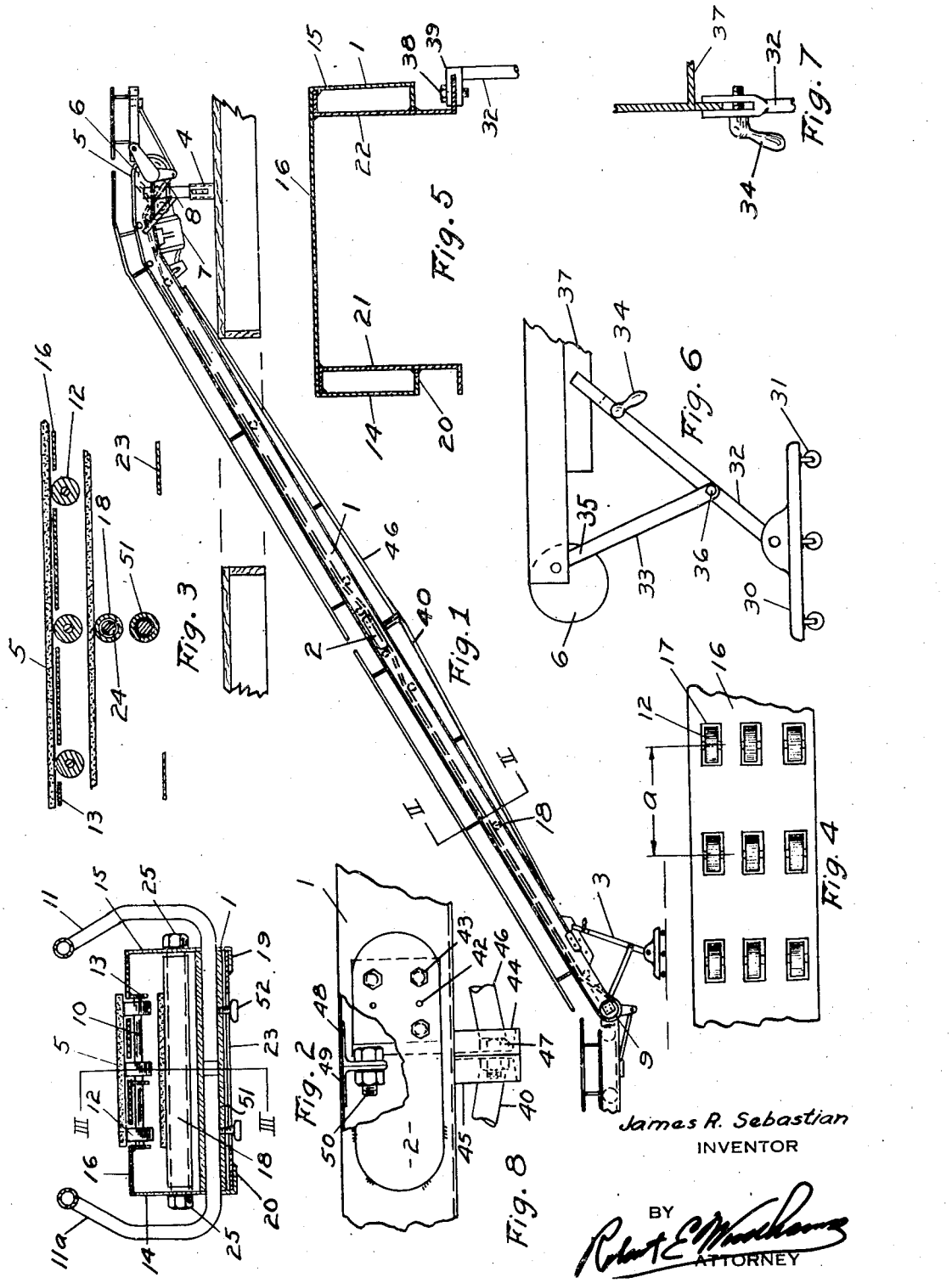
James R. Sebastian
INVENTOR
BY
ATTORNEY Patented Dec. 28, 1948

2,457,407

UNITED STATES PATENT OFFICE 2,457,407

ROLLER SUPPORT FOR CONVEYER BELTS

James R. Sebastian, Grand Rapids, Mich., assignor to The Rapids-Standard Company, Inc., Grand Rapids, Mich., a corporation of Michigan Application January 8, 1945, Serial No. 571,750

6 Claims. (Cl. 198—184)

This invention relates to a conveyor and particularly to a type of conveyor construction which will make possible a substantially self-contained unit.

In the art of handling materials and conveying them from one point to another, such as articles in a factory being conveyed from one floor to another, there has long been a wide choice of available equipment, of which much has been satisfactory only when considered solely from the standpoint of effecting its ultimate purpose. However, to my knowledge, the available equipment is all expensive and difficult to install and/or move because it it ordinarily built up from parts which are cut to fit the particular installations and largely assembled in the operating location. For example, in one kind of common conveyor which utilizes a series of rollers, these rollers are expensively mounted in a pair of channels which are suitably held in position by welded supports which are large in number in order to hold the channels in proper position with respect to each other for keeping the rollers properly aligned. This is effective but each installation requires individual assembly and is therefore both expensive to install and hard to move.

Further, it has been found that where a belt is used and a particularly heavy load is placed thereon, the belt will often sag between the rollers sufficiently to cause an undesirable wabbling of the load. This wabbling may be merely unsightly or it may cause actual displacement of the load.

In other installations economy is sought by eliminating the rollers and causing the conveyor belt to be supported solely by a smooth metal sliding surface. This effectively cuts down the cost of construction but if a very heavy load is placed on the belt the friction between the belt and the supporting metal panel is too great for efficient operation.

While an expensive, relatively immovable, installation is not particularly objectionable in certain substantially permanent factory uses, there are other installations and potential installations where a light, inexpensive, easily installed, movable and removable conveyor would be highly advantageous. For example, in a rapidly growing manufacturing business where the machinery is being frequently rearranged it is desirable to have a conveyor which can be easily installed and moved as desired and which, additionally, can be installed as a series of units so that new units may be easily added as needed. Further, there are a large number of situations in warehouses, grocery stores, dairies and similar wholesale or retail organizations where large quantities of bulky materials must be loaded and unloaded in and out of railroad cars or trucks, or from a floor to a platform, where a light and easily portable, self-contained power conveyor is highly useful.

It is therefore desired to construct a conveyor member which embodies sufficient belt-supporting rollers to assure economical operation but is also sufficiently simple to construct that the cost of manufacture will be small. It is also desired to construct a conveyor which will be inexpensive in both its original installation and in removal from one location to another.

It is a primary object of my invention to provide a conveyor unit which will be strong and durable and yet of sufficient physical simplicity to permit economical fabrication.

It is a further object of my invention to provide a conveyor unit having the above-named qualities which will have a low operation cost.

It is a further object of my invention to provide a conveyor unit which will have a low maintenance cost.

It is a further object of my invention to provide a conveyor unit which is substantially self-contained so that it will readily lend itself to unitary prefabrication, easy installation and convenient moving from one place to another.

Other objects and purposes similar to those above-named will be apparent to persons familiar with the art upon the examination of the following disclosure and the accompanying drawings.

In the drawings:

Fig. 1 represents an overall side view of a conveyor embodying my improved construction.

Fig. 2 is a section view taken on line II—II of Fig. 1.

Fig. 3 is a portion of a longitudinal section taken on line III—III of Fig. 2.

Fig. 4 is a top view of a portion of a conveyor unit with the conveyor belt removed.

Fig. 5 is an alternative form of frame section shown in a view similar to that of Fig. 2.

Fig. 6 is a detail showing of one means for adjustably supporting an end of the conveyor.

Fig. 7 is a detail showing a form of means for holding the supporting mechanism in selected position.

Fig. 8 is a detail showing a form of means for holding together the connecting ends of two abutting sections.

In providing a device to meet the above-named purposes I have made the load carrying portion of the conveyor frame from a single sheet of metal formed into a partial box shape and have provided individual rollers partially extending through individual openings in the upper sheet of the said frame. By this box construction I secure at a low cost all of the strength which is provided by the more conventional construction involving a pair of channels welded into position by a plurality of supporting braces. By having individual rollers extending respectively through a plurality of openings, I secure efficient and easy movement of the conveyor belt without the weakening of the box section which would occur if a single wide opening were cut in the upper side of said box to accommodate a single roller. By having the upper surface of the box frame fairly close, in one embodiment it is one-quarter inch, to the undersurface of the conveyor belt, support is provided for the conveyor belt when needed to hold up a heavy load without placing the rollers so closely together as to inject undue expense into the fabrication of this device. On the other hand sufficient rollers are provided so that even when said upper surface of the box frame is supporting a portion of the load the frictional drag of the belt is held at a minimum.

As shown in Fig. 1, my conveyor comprises essentially the unitary box frame 1, which is described in more detail hereinafter, of which individual units are fastened together by suitable means as needed. Each end is supported, often on different floors, by vertically adjustable supports 3 and 4 which units are sometimes mounted on lockable casters for easy movement on the floor as needed after which they may be locked into position. A conveyor belt 5 is provided of a convenient material, such as a rubber impregnated canvas, and it is supported by the main box section 1 as described in detail hereinafter. This conveyor belt 5 is caused to move by a drive pulley 6 suitably supported at one end of the conveyor assembly. A convenient prime mover drives said pulley in any suitable manner. In the figure, said prime mover is an electric motor 7 which is mounted on the underside of the conveyor frame and drives the drive pulley 6 by a belt 8. Said belt 8 is conveniently a V-belt or a chain. An idler pulley 9 is located at the other end of the conveyor assembly for supporting the other end of the conveyor belt. Suitable feed and receiving means may be provided at each end of the conveyor unit. These may either be fixed tables or moving conveyor belts as needed for the purposes to be served.

Looking now at Figs. 2, 3 and 4 the box frame 1 comprises the top section 16, a pair of side sections 14 and 15 and a pair of turned over bottom members 19 and 20 all formed from a single sheet of metal such as for example, #10 or #12 gauge steel. A bottom brace 23 may be inserted and bolted or welded into position to provide further strength if needed.

Through the top member 16 there is cut a plurality of openings 17, as best shown in Fig. 4, for the accommodation of the rollers 12. For a conveyor section 10 to 24 inches wide three rollers laterally will be found convenient and the center-to-center spacing "a" of the rollers will be conveniently about six inches. In order not to impair unnecessarily the strength of the box frame 1 the openings 17 should not be cut any larger than required to permit the individual rollers 12 to extend the desired distance above the top surface of the top member 16. For a belt corresponding to a conveyor frame of width indicated above, this distance will conveniently be about one-quarter of an inch.

The rollers 12 are mounted for individual rotation, preferably upon ball bearings, by any convenient means. This may be a roller rod 10 hung on support strips 13. These are fixed to the box section 1 in any convenient manner, as by welding onto the upper member 16 thereof.

The idler rollers 18 for the return belt are supported on a bearing rod 24 which is supported by the side members 14 and 15 and held in place in any convenient manner such as by the nuts 25.

Further strength may be imparted to the box frame 1, where side rails are used, by welding across said frame a side rail receiving pipe 51. This receives the members comprising the side rail supports 11 and 11a, as shown in Fig. 2. They are held in position by thumb screws 52 or other convenient means.

In Fig. 5 there is shown an alternative form of the box frame 1. In this the side members 14 and 15, the top member 16 and the bottom turned-back members 19 and 20 are all the same as shown in Fig. 2. There is added, however, for further strength the reinforcing members 21 and 22 which are of wide U-shape, placed inwardly of the side members 14 and 15 with the open sides of the respective U's facing outwardly. These are fastened into position as shown in any convenient manner as by welding or bolting.

When this latter form of box frame is used, the roller member 18 must be correspondingly shortened but all other parts remain the same. Particularly, the openings 17, the rollers 12 for supporting the conveyor belt 5, the means for mounting said rollers and the means for mounting the idler roller 18 are all the same in the reinforced box frame of Fig. 5 as shown and described for the box frame of Fig. 2.

In Fig. 6 is illustrated means supporting the conveyor for easy and rapid vertical adjustment. It is here shown as applied to the lower end of the conveyor but may be applied to both ends. Suitable wheeled support, such as a foot member mounted on casters, pivotally supports a long brace 32 in a manner to permit its pivotal movement in a vertical plane with respect to the floor. This long brace in turn supports the conveyor bed. A short brace 33 is pivotally supported at one end 36 by the long brace 32 and at the other end 35 it pivotally supports the conveyor bed. The short member 33 is of length about equal to the portion of the long member 32 between the pivot point 36 and the upper end of said long member. The long member is held adjustably in position with respect to the conveyor bed by any quick acting mechanism, such as a U-shape member embracing a depending flange 37 and caused to grip it by the turning of a shouldered screw 34 which is threaded into one side of said U-member and turns freely in the other side, so that the rotation of the screw 34 will move the flanges of the U-member together or apart as desired. Alternatively, a C-member 39 may engage a flange 50 suitably affixed to the main frame section 1 and be held in position by a pin 38. These members may be singly and centerwise of the conveyor bed, but they will usually be in pairs, one group of members as illustrated placed on each side of the conveyor bed.

It will be observed by reference to Fig. 1 that the conveyor may be made in two or more independent units which are fastened together as needed. In Fig. 8 is presented a detailed drawing of a preferred means of fastening two of these sections together.

The truss rods 40 and 46 are affixed in any convenient manner, as by bolting or welding, to the underside of the conveyor bed sections 1 and are held away from the said conveyor bed section by compression members 44 and 45 to which they are fastened in any convenient manner, as by bolting. A bolt 47 completes the tension connection between said truss rods. A pair of angles 48 and 49 are fastened, one on each conveyor section, and bolted together by a series of bolts 50. A plate 2 is bolted across the abutting ends of a pair of conveyor bed sections 1 connecting them together. Dowel pins 42, and corresponding openings, are provided for the plate 2 and the respectively cooperating ends of each conveyor section to secure proper alignment. The fastening bolts 43 fasten the plate to the conveyor sections.

Since the entire driving mechanism is contained in a single unit a large number of these conveyor sections may be fastened together in any of several possible ways with great flexibility and ease of assembly. Supports will be used as needed in view of the load to be carried.

It will be seen accordingly that my conveyor comprises a series of substantially self-contained units which are easily assembled and disassembled as desired to make it readily adaptable to a wide variety of circumstances and particularly, the box frame sections have made possible a large variety of unitary constructions which can be prefabricated at a greatly reduced cost over formerly available constructions and installed as desired with a minimum of on-the-scene work. It is evident that considerable variation in proportions, type and number of rollers, idler roller for the return belt and other design details may be made without departing from the concept of my invention, and all such variations will be included within the scope of my claims except only as they may expressly provide otherwise.

I claim:

1. In conveyor construction the combination comprising: a box-shaped frame member of closed rectangular cross section and constructed with a plurality of longitudinally aligned apertures in the upper sheet of said frame member; a strip affixed perpendicularly to said upper sheet on the underside thereof and longitudinally of said frame member closely adjacent each row of apertures and extending along said frame for a substantial portion of its length; and plurality of roller supporting axles held by said strips; a plurality of rollers on said axles and each roller extending a minor fraction of its diameter through one of said apertures.

2. In conveyor construction, the combination comprising: a box-shaped frame member having upper, side and bottom sheets and constructed with a plurality of apertures in the upper sheet of said frame member arranged across the width thereof and aligned in longitudinal rows; a roller within said frame member extending partially through each of said apertures and means supporting said rollers in such position; a conveyor belt carried by said rollers and normally held thereby away from the upper sheet of said frame member a relatively small distance, the spacing of said rollers from each other and the spacing of said belt away from said upper sheet being such that under load the belt may be partially supported by direct contact with said upper sheet; transversely arranged tubular support members rigidly affixed to the box-shaped frame member; laterally adjustable side rails extending longitudinally of said frame member and substantially the full length thereof said side rails having supporting parts associated therewith slidably inserted into said tubular support members and adjustably held thereto.

3. In conveyor construction, the combination comprising: a box-shaped frame member having upper, side and bottom sheets and constructed with a plurality of apertures in the upper sheet of said frame member arranged across the width thereof and aligned in longitudinal rows, and a continuous strip affixed perpendicularly to said upper sheet on the underside thereof and longitudinally of said frame member closely adjacent each row of apertures and extending along said frame member for a substantial portion of its length; a plurality of roller supporting shafts held by said strips; a plurality of rollers supported by said shafts within said frame member extending partially through said apertures; a conveyor belt carried by said rollers and normally spaced away from said upper sheet of said frame member a relatively small distance, the spacing of said rollers from each other and the spacing of said belt away from said upper sheet such that under load the belt may be partially supported by direct contact with said upper sheet; transversely arranged tubular support members rigidly affixed to the box-shaped frame members; laterally adjustable side rails extending longitudinally of said frame members and substantially the full length thereof, said side rails having parts thereof slidably inserted into said tubular support members and adjustably held thereto.

4. In conveyor construction, the combination comprising: a box-shaped frame member having upper, side and bottom sheets and constructed with a plurality of apertures in the upper sheet of said frame member arranged across the width thereof and aligned in longitudinal rows; a roller within said frame member extending partially through each of said apertures and means supporting said rollers in such position; a conveyor belt carried by said rollers; transversely arranged tubular support members rigidly affixed to the box-shaped frame member; laterally adjustable side rails extending longitudinally of said frame member and substantially the full length thereof, said side rails having supporting parts associated therewith slidably inserted into said tubular support members and adjustably held thereto.

5. In conveyor construction, the combination comprising: a box-shaped frame member having upper, side and bottom sheets and constructed with a plurality of apertures in the upper sheet of said frame member arranged across the width thereof and aligned in longitudinal rows, and a continuous strip affixed perpendicularly to said upper sheet on the underside thereof and longitudinally of said frame member closely adjacent each row of apertures and extending along said frame member for a substantial portion of its length; a plurality of roller supporting shafts held by said strips; a plurality of rollers supported by said shafts within said frame member extending partially through said apertures; a conveyor belt carried by said rollers; transversely arranged tubular support members rigidly affixed to the box-shaped frame members; laterally adjustable side rails extending longitudinally of said frame members and substantially the full length thereof, said side rails having parts thereof slidably inserted into said tubular support members and adjustably held thereto.

6. In conveyor construction the combination comprising: a box shaped frame member of rectangular cross section; a plurality of apertures longitudinally aligned in a plurality of rows in the upper sheet of said frame member; a plurality of strips fixed perpendicularly of said upper sheet on the under side thereof and extending longitudinally of said frame member, each said strip extending along said frame member for a substantial portion of the length of said frame member being located, respectively, closely adjacent each row of apertures; a plurality of roller supporting axles held by said strips; a plurality of rollers on each of said axles and each of said rollers extending, respectively, a minor fraction of its diameter through each of said apertures.

JAMES R. SEBASTIAN.

REFERENCES CITED

The following references are of record in the file of this patent:

UNITED STATES PATENTS

| Number | Name | Date |
|---|---|---|
| 1,355,308 | Brown | Oct. 12, 1920 |
| 1,971,991 | Robertson | Aug. 28, 1934 |
| 2,169,772 | Schweitzer | Aug. 15, 1939 |
| 2,297,849 | Wolcott | Oct. 6, 1942 |

FOREIGN PATENTS

| Number | Country | Date |
|---|---|---|
| 398,254 | Great Britain | Sept. 14, 1933 |